Patented Jan. 9, 1923.

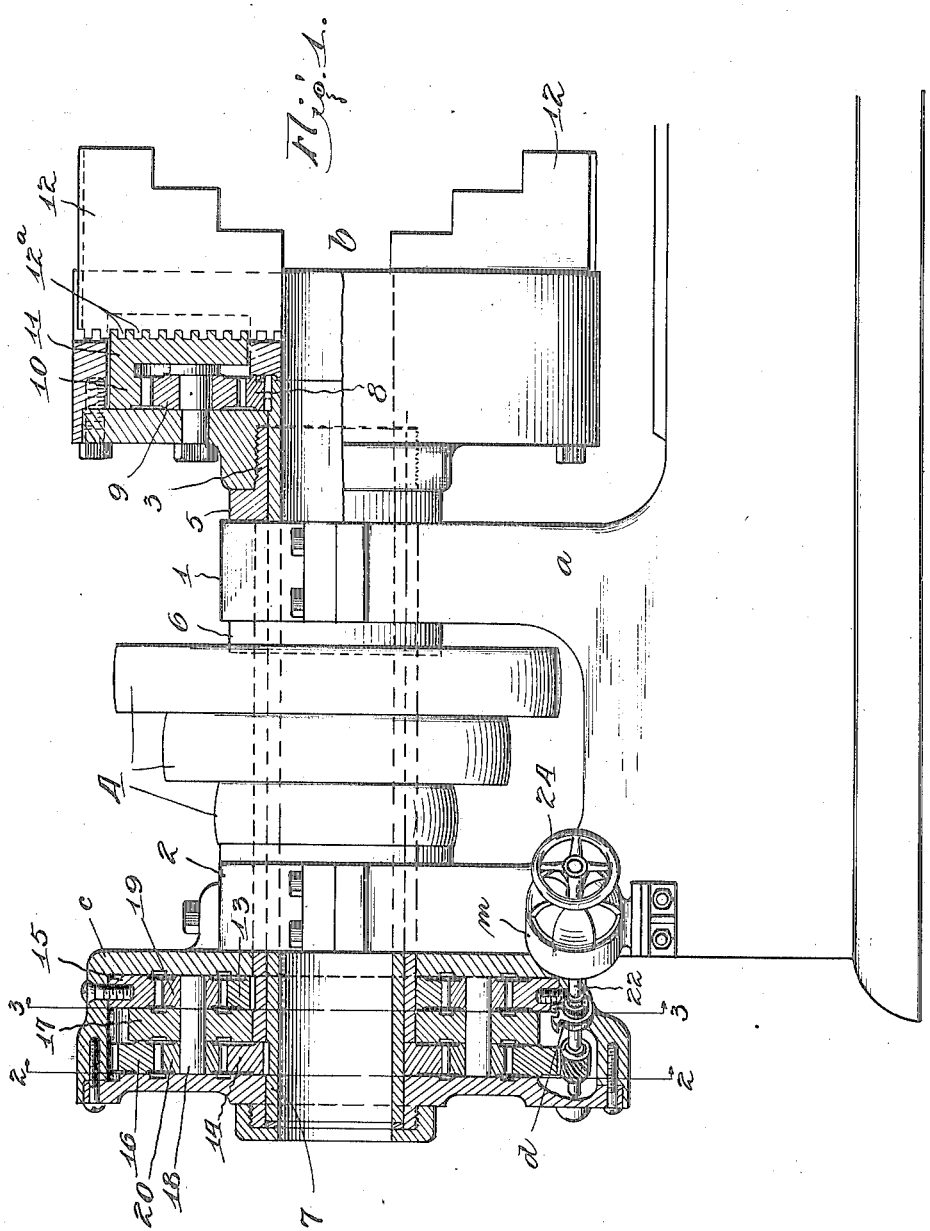

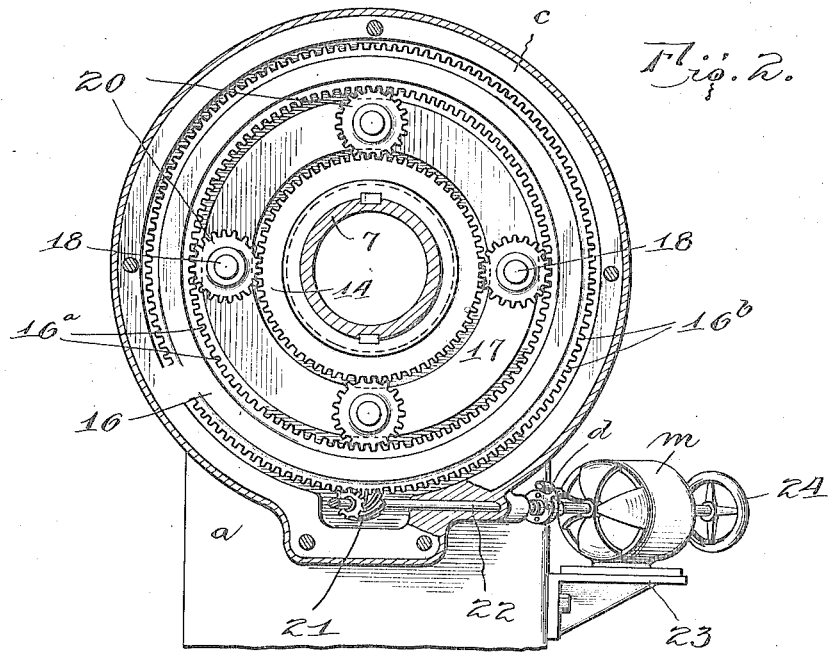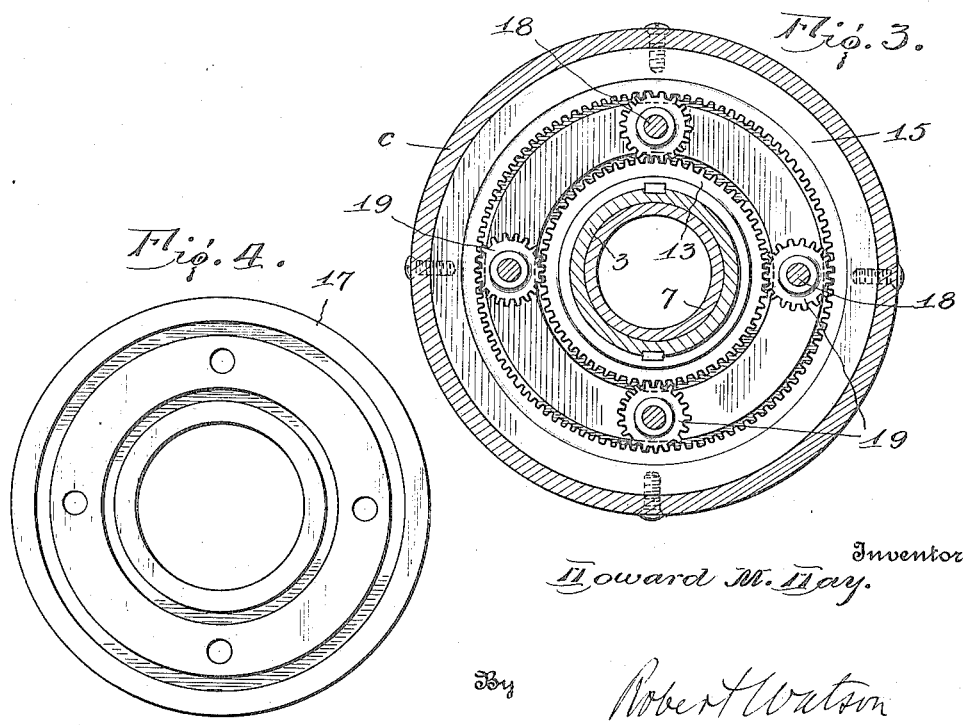

1,441,803

UNITED STATES PATENT OFFICE.

HOWARD MORTON HAY, OF WENONAH, NEW JERSEY.

MOTOR-OPERATED CHUCK.

Application filed May 8, 1922. Serial No. 559,390.

*To all whom it may concern:*

Be it known that I, HOWARD MORTON HAY, a citizen of the United States, residing at Wenonah, in the county of Gloucester and State of New Jersey, have invented certain new and useful Improvements in Motor-Operated Chucks, of which the following is a specification.

This invention relates to improvements in power operated chucks for lathes, boring machines and the like. In my co-pending application Serial No. 545,608, filed March 21, 1922, I have shown means for operating the jaws of a chuck, while the latter is running or stopped, by power applied through a shaft mounted in fixed bearings and driven by a suitable motor, the operating means for the jaws including a shaft or plunger rotatable with the lathe spindle and movable longitudinally therein to actuate the jaws through levers in the chuck. In the present invention, I provide means whereby the shaft within the spindle may be rotated, by power or by hand, relatively to the spindle, while the chuck is running or stopped and this relative movement of the shaft is utilized to operate the chuck jaws through a scroll plate on the chuck, or it may be utilized to operate the chuck jaws through various well known intermediate devices in the chuck.

In the accompanying drawing,

Fig. 1 is a side elevation, partly in central section, of a lathe head and chuck, with hollow spindle equipped with my improvements for operating the chuck jaws;

Fig. 2 is a section on the line 2—2 of Fig. 1;

Fig. 3 is a section on the line 3—3 of Fig. 1; and,

Fig. 4 is a side elevation of the traveling ring for supporting the idle pinions.

Referring to the drawing, $a$ indicates a lathe head having bearings 1 and 2, in which is mounted a hollow lathe spindle 3, carrying the chuck $b$. The spindle carries the usual driving pulleys 4, and has the shoulders 5 and 6 which are usually provided on opposite sides of the main bearings 1, for taking the end thrust of the spindle. Within the spindle is arranged a hollow shaft or sleeve 7, having on its forward end a gear 8, which meshes with one or more pinions 9 arranged within the body of the chuck and engaging an internal gear 10, on a scroll plate 11. The jaws 12 of the chuck are provided with teeth $12^a$ which enter the groove in the scroll plate, and when the latter is turned with respect to the chuck body, the jaws will be moved radially to grip or release the work in well known manner. The lathe spindle projects through the bearing 2 into a casing $c$, which is secured to the lathe head, and a gear 13 (Figs. 1 and 3) is keyed to the spindle and arranged within the casing. The shaft or sleeve 7 projects into the casing beyond the end of the spindle and carries a gear 14 of the same pitch diameter as the gear 13, the gear 14 being keyed, or otherwise secured to the sleeve. A stationary annular rack 15, having internal teeth, is arranged within the casing in the plane of the gear 13, and an adjustable annular rack 16 is arranged within the casing in the plane of the gear 14. A traveling ring 17 is mounted between the gears 13 and 15 on the one side and the gears 14 and 16 on the other side, and this ring carries a plurality of short shafts or studs 18 which project to equal distances on the opposite sides of the ring. Upon each of these shafts is rotatably mounted a pinion 19 which meshes with the gear 13 and the rack 15, and a pinion 20 which meshes with the gear 14 and the rack 16.

The adjustable annular rack 16 has the internal teeth $16^a$ which engage the pinions 20, and also external teeth $16^b$ which are engaged by a pinion 21 upon a shaft 22 which projects through the casing $c$ and is driven through a lost motion coupling $d$ by an electric motor $m$, the latter being mounted upon a bracket 23, secured to the front side of the lathe head. The shaft 22 may be turned by the motor or by a hand wheel 24, which is mounted upon an extension of the armature shaft of the motor.

In operation, assuming the lathe spindle to be turning by power applied to one of the pulleys 4, the gears 13 and 14, on the spindle and shaft, respectively, will turn in unison. The pinions 19 and 20, which engage the gears 13 and 14, will be turned by these gears and will roll around on the annular racks 15 and 16, and the traveling disk or carrier 17 will revolve about the spindle and sleeve with the pinions. If, now, it is desired to open or close the chuck jaws, without stopping the rotation of the chuck, the motor will be started, through suitable switch mechanism, not shown, and this will cause the adjustable rack 16 to move about its axis relatively to the stationary rack 15, causing an acceleration or retardation of the speed of the pinions 20 about their axes, and consequently an advancement or retardation of the gear 14 with respect to the gear 13. Hence, the sleeve 7 will be turned about its axis relatively to the spindle 3, and the gear 8 on the sleeve will turn the pinion 9, which is mounted upon the chuck body, and the latter pinion, by reason of its engagement with the gear 10 on the scroll plate, will cause the latter to turn with respect to the chuck body and move the jaws inward or outward according to the direction in which the armature of the motor $m$ is turned. If the motor armature is operated in one direction, the jaws will be moved inward, and if the motor armature is turned in the opposite direction, the jaws will be moved outward, and this is accomplished without stopping the rotation of the chuck. It will be understood that the motor armature will be stopped when the jaws have firmly gripped the work, and also when the jaws have been released from the work. When the lathe spindle and chuck are stationary, the operation of adjusting the jaws inward or outward, by power or by hand, will be substantially the same as above described. In the latter case, the gear 13 will be held stationary by the spindle and the gear 14 on the sleeve or hollow shaft will be moved relatively to the gear 13 by the adjustment of the rack 16. This movement of the shaft relatively to the spindle will cause the actuation of the jaws.

By the arrangement described, I am able to use a stationary motor for operating the chuck jaws while the chuck is in motion as well as while stopped. The mechanism for actuating the jaws does not interfere with the extension of the work through the spindle. While it is desirable to employ a hollow shaft within the spindle, to avoid interference with the work, it will be understood that a sold shaft may be used, if desired.

The gearing might be arranged on the same side of the bearings as the chuck, but by arranging the gearing on one side of the bearings and the chuck on the other side, the overhang of the chuck is reduced and the load on the spindle is balanced. I have shown a chuck of the geared scroll type, but it will be understood that the invention is applicable to other types of chuck.

The provision of a hand wheel on the motor shaft enables the operator to manually actuate the chuck jaws in case the power fails, and it also enables the operator to lessen the grip of the jaws on the work, when desired. The lost motion coupling permits the motor to start free and jar the shaft to loosen the driven parts and jaws.

What I claim is:

1. The combination with a hollow lathe spindle and a chuck thereon, of a shaft journaled in the spindle, connections between the shaft and chuck jaws for operating the latter when the shaft is rotated relatively to the chuck jaws, gearing between the spindle and shaft for causing said spindle and shaft to rotate in unison, said gearing including two normally stationary annular racks, one of which is adjustable to cause rotation of the shaft relatively to the spindle, and a motor geared to the latter rack.

2. The combination with a hollow lathe spindle and a chuck thereon, the latter having a scroll plate for operating the chuck jaws, of a shaft journaled in the spindle and geared to said scroll plate, gearing between the spindle and shaft for causing said spindle and shaft to rotate in unison, said gearing including two normally stationary annular racks, one of which is adjustable to cause rotation of the shaft relatively to the spindle, and a motor geared to the latter rack.

3. The combination with a lathe head having bearings, a hollow spindle projecting through the bearings and a chuck on said spindle at one side of the bearings, of a shaft journaled in and extending through the spindle, connections between the shaft and chuck jaws for operating the latter when the shaft is rotated relatively to the chuck jaws, gearing between the spindle and shaft, at the other side of the bearings, for causing the spindle and shaft to rotate in unison, said gearing including two normally stationary annular racks, one of which is adjustable to cause rotation of the shaft relatively to the spindle, and a motor geared to the latter rack.

4. The combination with a lathe head having bearings, a hollow spindle projecting through the bearings and a chuck on said spindle, of a shaft journaled in and extending through the spindle, connections between said shaft and the chuck jaws for operating the jaws when the shaft is rotated relatively to the spindle, gears on the spindle and shaft, a stationary annular rack, having internal teeth, surrounding the former gear, an adjustable annular rack, having internal and external teeth, surrounding the latter gear, a carrier rotatable about the axis of the spindle and having two sets of idle gears, one set engaging the gear on the spindle and the stationary rack and the other set engaging the gear on the shaft and the adjustable rack, and a motor geared to said latter rack.

5. The combination with a lathe head having bearings, a hollow spindle projecting through the bearings, and a chuck on said spindle at one side of the bearings, of a shaft journaled in and extending through the spindle, connections between said shaft and the chuck jaws for operating the jaws when the shaft is rotated relatively to the spindle, gears on the spindle and shaft, at the other side of said bearings, a stationary annular rack, having internal teeth, surrounding the former gear, an adjustable annular rack, having internal and external teeth, surrounding the latter gear, a carrier rotatable about the axis of the spindle and having two sets of idle gears, one set engaging the gear on the spindle and the stationary rack and the other set engaging the gear on the shaft and the adjustable rack, and a motor geared to said latter rack.

In testimony whereof I affix my signature.

HOWARD MORTON HAY.